US012135640B2

(12) United States Patent
Liu et al.

(10) Patent No.: US 12,135,640 B2
(45) Date of Patent: Nov. 5, 2024

(54) GENERAL BLOCKCHAIN PERFORMANCE EVALUATION METHOD BASED ON DYNAMIC PROXY AND SMART CONTRACT

(71) Applicant: Tianjin University, Tianjin (CN)

(72) Inventors: Xiulong Liu, Tianjin (CN); Liyuan Ma, Tianjin (CN); Chenyu Zhang, Tianjin (CN); Yuhan Li, Tianjin (CN); Keqiu Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/395,155

(22) Filed: Dec. 22, 2023

(65) Prior Publication Data
US 2024/0220404 A1    Jul. 4, 2024

(30) Foreign Application Priority Data
Dec. 29, 2022  (CN) .......................... 202211709268.3

(51) Int. Cl.
*G06F 11/36*    (2006.01)
*G06F 11/34*    (2006.01)

(52) U.S. Cl.
CPC ...... *G06F 11/3692* (2013.01); *G06F 11/3414* (2013.01); *G06F 11/3684* (2013.01)

(58) Field of Classification Search
CPC ............. G06F 11/3692; G06F 11/3414; G06F 11/3684

(Continued)

(56) References Cited

U.S. PATENT DOCUMENTS

| 6,907,546 B1 * | 6/2005 | Haswell ............. G06F 11/3684 |
| | | 717/124 |
| 6,983,371 B1 * | 1/2006 | Hurtado .................. H04L 9/321 |
| | | 726/28 |

(Continued)

FOREIGN PATENT DOCUMENTS

| CN | 104331477 A | 2/2015 |
| CN | 108830720 A | 11/2018 |

(Continued)

OTHER PUBLICATIONS

Young et al, "Blockchain-based Service Performance Evaluation Method Using Native Cloud Environment", IEEE, p. 52—(Year: 2020).*

(Continued)

*Primary Examiner* — Anil Khatri
(74) *Attorney, Agent, or Firm* — Piloff Passino & Cosenza, LLP; Rachel Piloff; Sean Passino

(57) ABSTRACT

The disclosure discloses a general blockchain performance evaluation method based on a dynamic proxy and a smart contract, and the method includes following steps: obtaining an automation configuration item script, configuring a chain system to be tested based on the automation configuration item script, and designing a proxy server network interface of the chain system to be tested; obtaining a general hierarchical test workload, and obtaining an environmental test result of the chain system to be tested based on the proxy server network interface and the general hierarchical test workload; obtaining a workload test execution result based on the proxy server network interface and the environmental test result; and carrying out a multi-dimensional evaluation on the workload test execution result to complete a blockchain performance evaluation.

6 Claims, 18 Drawing Sheets

(58) Field of Classification Search
USPC .................................................. 717/124–140
See application file for complete search history.

(56) References Cited

U.S. PATENT DOCUMENTS

| | | | | |
|---|---|---|---|---|
| 8,522,083 | B1* | 8/2013 | Cohen | G06F 9/44589 |
| | | | | 717/125 |
| 9,998,471 | B2* | 6/2018 | Haghpassand | H04L 63/101 |
| 10,509,684 | B2* | 12/2019 | Florissi | H04L 9/3239 |
| 10,542,046 | B2* | 1/2020 | Katragadda | H04L 63/20 |
| 10,587,586 | B2* | 3/2020 | Kumar | H04L 9/3268 |
| 10,657,261 | B2* | 5/2020 | Kumar | G06F 16/1834 |
| 10,873,456 | B1* | 12/2020 | Dods | H04L 9/0822 |
| 10,963,786 | B1* | 3/2021 | Taylor | G06N 3/084 |
| 11,025,627 | B2* | 6/2021 | Li | H04L 67/53 |
| 11,194,791 | B1* | 12/2021 | Baine | G06F 9/54 |
| 11,764,989 | B2* | 9/2023 | Serwatowski | H04L 12/282 |
| 12,015,721 | B1* | 6/2024 | Kumar | H04L 9/3263 |
| 12,032,476 | B2* | 7/2024 | Ferreira | G06F 8/436 |

FOREIGN PATENT DOCUMENTS

| | | | |
|---|---|---|---|
| CN | 109753433 | A | 5/2019 |
| CN | 109981416 | A | 7/2019 |
| CN | 111159143 | A | 5/2020 |
| CN | 112866421 | A | 5/2021 |
| CN | 113238965 | A | 8/2021 |

OTHER PUBLICATIONS

Udokwu et al, "Evaluation of Approaches for Designing and Developing Decentralized Applications on Blockchain", ACM, pp. 55-62 (Year: 2020).*
Song et al, "A Comparative Performance Analysis of Vulnerability Detection Schemes for Specific Blockchain Applications", IEEE, pp. 1716-1720 (Year: 2023).*
Harlian et al, "Implementation of Blockchain for Digital Document Data Collection Website", IEEE, pp. 425-430 (Year: 2022).*
Zheng et al, "A Detailed and Real-time Performance Monitoring Framework for Blockchain Systems", ACM, pp. 134-143 (Year: 2018).*
Fan et al, "Smart Contract Scams Detection with Topological Data Analysis on Account Interaction", ACM, pp. 468-477 (Year: 2022).*
First Office Action for China Application No. 202211709268.3, mailed Jun. 16, 2023.
Notification to Grant Patent for China Application No. 202211709268.3, mailed Jul. 19, 2023.
First Search Report for China Application No. 202211709268.3, dated Jun. 15, 2023.
Supplementary Search Report for China Application No. 202211709268.3, dated Jul. 13, 2023.

* cited by examiner

GENERAL BLOCKCHAIN PERFORMANCE EVALUATION METHOD BASED ON DYNAMIC PROXY AND SMART CONTRACT

CROSS-REFERENCE TO RELATED APPLICATIONS

This disclosure claims priority to Chinese Patent Application No. 202211709268.3, filed on Dec. 29, 2022, the contents of which are hereby incorporated by reference.

TECHNICAL FIELD

The disclosure relates to the technical fields of computer network and blockchain, and in particular to a general blockchain performance evaluation method based on a dynamic proxy and a smart contract.

BACKGROUND

The performance of a distributed system is generally used to measure the target efficacy that the system can achieve. Performance indicators may include the number of processes that may be processed per second or the length of time required under specific requirements. For the blockchain system, performance usually refers to the average time required for a transaction to be verified and stored in each peer node in an irrevocable way, reflecting the rate of the data on-chaining.

However, similar to the distributed system, the blockchain system also has the problem of impossible trinity, that is, the current mainstream blockchain system can only handle a very small transaction throughput (very limited transactions per second (TPS)) while effectively ensuring decentralization and security; however, as for ensuring the throughput of high-frequency transactions, the security and decentralization degree are greatly weakened. Multi-dimensional performance indicators such as high efficiency, safety, fairness and low overhead are actually mutually restrictive. Therefore, around what a good blockchain system is and how to evaluate the quality of a blockchain system, it is an important topic in the current blockchain technology field to carry out multi-dimensional and hierarchical research on the performance evaluation architecture of the blockchain system, analyze restrictive factors affecting the performance of blockchain system, and propose possible system performance improvement schemes for blockchain application scenarios.

At present, the most mainstream blockchain performance benchmark framework, including Blockbench, designs and implements test workloads such as SmallBank and kv-store, and tests several blockchain systems through a certain degree of workload encapsulation, and tests metrics such as throughput, transaction delay and Central Processing Unit (CPU) and memory overhead. CaliperBlockchain NBI from Caliper is the most mainstream abstract reference of blockchain Application Programming Interface (API) at present. Compared with the basic database abstraction of Blockbench in Macro layer, Caliper can better reflect unique characteristics of blockchain system; yet. Caliper fails to analyze deeper into the various stages of the transaction life cycle. Zheng et al. put forward overall performance metrics and detailed performance metrics of the blockchain system to let users know exact performances of the blockchain at different stages, and put forward a performance monitoring framework based on system logs, which has advantages of low overhead, fine granularity and high scalability. However, the above-mentioned blockchain performance testing frameworks still have following outstanding problems; first, due to different deployment methods of blockchain system environment, access processes of existing evaluation frameworks are complex and the evaluation standardization is insufficient; second, the evaluation emphasises of the existing evaluation frameworks are different, the hierarchical performance evaluation is very rough, and the design of macro-tests and micro-tests is relatively separated, so it is difficult to compare the performance of each blockchain system; and third, the evaluation interface for new domestic blockchain, especially the blockchain system that does not support Json RPC, is lacking, and the generality and flexibility of the existing evaluation frameworks are poor. Therefore, based on the dynamic proxy pattern and the smart contract technology, the automatic deployment configuration items, evaluation client-side, proxy driver and indicator parser of the blockchain system are designed to provide a more general, efficient and convenient hierarchical performance evaluation of the blockchain.

SUMMARY

The disclosure aims to propose a general blockchain performance evaluation method based on a dynamic proxy and a smart contract, so as to solve problems of poor generality, low workload execution efficiency and single evaluation metric of the existing blockchain performance evaluation architecture; the method provides efficient, flexible and easy-to-deploy hierarchical performance evaluation for various types of current blockchain system platforms for analyzing the performance bottleneck and inherent design defects of the system, thus providing guidance for system performance improvement and design optimization as well as reasonable suggestions for the standardized development of blockchain systems in the future.

In order to achieve the above objectives, the present disclosure provides a general blockchain performance evaluation method based on a dynamic proxy and a smart contract, including following steps:

obtaining an automation configuration item script, configuring a chain system to be tested based on the automation configuration item script, and designing a proxy server network interface of the chain system to be tested;

obtaining a general hierarchical test workload, and obtaining an environmental test result of the chain system to be tested based on the proxy server network interface and the general hierarchical test workload;

obtaining a workload test execution result based on the proxy server network interface and the environmental test result; and carrying out a multi-dimensional evaluation on the workload test execution result to complete a blockchain performance evaluation.

Optionally, the configuring the chain system to be tested based on the automation configuration item script specifically includes: Secure Shell (SSH) secret-free login, node configuration, dependent installation, source code compilation, account activation, consensus protocol, encryption algorithm, certificate association, blockchain browser setting and cluster chaining.

Optionally, the designing the proxy server network interface of the chain system to be tested includes:

carrying out a layer by layer abstraction on the chain system to obtain common features of the chain system to be tested; and encapsulating the common features of the chain system to be tested to obtain the proxy server network interface in a preset format.

Optionally, the obtaining the environmental test result of the chain system to be tested based on the proxy server network interface and the general hierarchical test workload includes:

obtaining a workload connector, and obtaining a general layered test workload based on the workload connector; and interacting the general layered test workload with a proxy server, inputting the general layered test workload into an environment of the chain system to be tested in a form of a script field or a smart contract based on the proxy server network interface, and obtaining the environmental test result of the chain system to be tested.

Optionally, the obtaining the workload test execution result based on the proxy server network interface and the environmental test result includes:

where the proxy server network interface includes a data query interface and a log query interface;

polling and carrying out log pulling against the environmental test result based on the data query interface and the log query interface to obtain the workload test execution result.

Optionally, the polling and carrying out log pulling against the environmental test result based on the data query interface and the log query interface to obtain the workload test execution result includes:

polling the environmental test result based on the data query interface to obtain an on-chain data state;

calling a monitor program to obtain a resource usage of a node execution environment based on the environmental test result;

carrying out log pulling against the environmental test result to obtain process log information based on the log query interface; and summarizing the on-chain data state, the resource usage of the node execution environment and the process log information to obtain a workload test execution result.

Optionally, the carrying out the multi-dimensional evaluation on the workload test execution result to complete the blockchain performance evaluation includes:

inputting the workload test execution result into various metric model scripts, and obtaining a performance evaluation model based on metric parsing scripts; and carrying out the multi-dimensional evaluation on the performance evaluation model to complete the blockchain performance evaluation.

Optionally, the carrying out the multi-dimensional evaluation on the workload test execution result to complete the blockchain performance evaluation further includes:

carrying out the multi-dimensional evaluation based on the performance evaluation model to obtain a multi-dimensional evaluation result; and forming an evaluation report on the multi-dimensional evaluation result, and displaying the evaluation report.

Optionally, the performance evaluation model includes system throughput, average response delay, transaction success rate, unit transaction cost, unit Central Processing Unit (CPU) transaction volume, unit memory transaction volume, unit disk reading and writing transaction volume, unit network traffic transaction volume, node RPC response rate, transaction propagating rate, contract execution time, state updating time, consensus reaching time, consensus energy consumption ratio, and energy consumption ratio of contract form and script execution under a same execution logic.

The disclosure has following beneficial effects.

First, by carrying out a common abstraction on the parameter setting of the environment deployment of the chain system to be tested and other links, the automatic configuration item script is designed to realize one-click deployment and operation of the chain system to be tested, thus greatly reducing the deployment complexity of the chain system to be tested.

Second, the unified interaction between the dynamic proxy technology with a chain to be tested is realized, and the dynamic library of the adapter test engine provides common function operations in the blockchain system, which greatly reduces the implementation difficulty of the proxy server and the complexity of the interface, improves the generality of the system, and takes into account the customization of the test logic and the convenience of the chain to be tested.

Third, through the smart contract technology, the workload design is standardized, the reusability of test workload is improved, and then the performance of different systems may be compared horizontally. The Lua scripting language used by the client-side has a good combination with C/C++ and other languages, thus significantly improving the execution performance of the test framework.

Fourth, by designing a detailed performance evaluation model layer by layer, the performance bottleneck of the system is evaluated from multiple dimensions, and guidance is provided for the design optimization and performance improvement of the system.

Fifth, the main framework of the proxy server is realized by GO language, and the goroutine concurrency technology is used to improve the execution efficiency of the system and facilitate the promotion and iteration of the evaluation framework.

BRIEF DESCRIPTION OF THE DRAWINGS

The accompanying drawings constituting a part of the disclosure are used to provide a further understanding of the disclosure. The illustrative embodiments of the disclosure and their descriptions are used to explain the disclosure, and do not constitute an improper limitation of the disclosure. In the attached drawings.

DETAILED DESCRIPTION OF THE EMBODIMENTS

It should be noted that the embodiments in the disclosure and the features in the embodiments may be combined with each other without conflict. The present disclosure is described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

Embodiment 1

Figure 1:
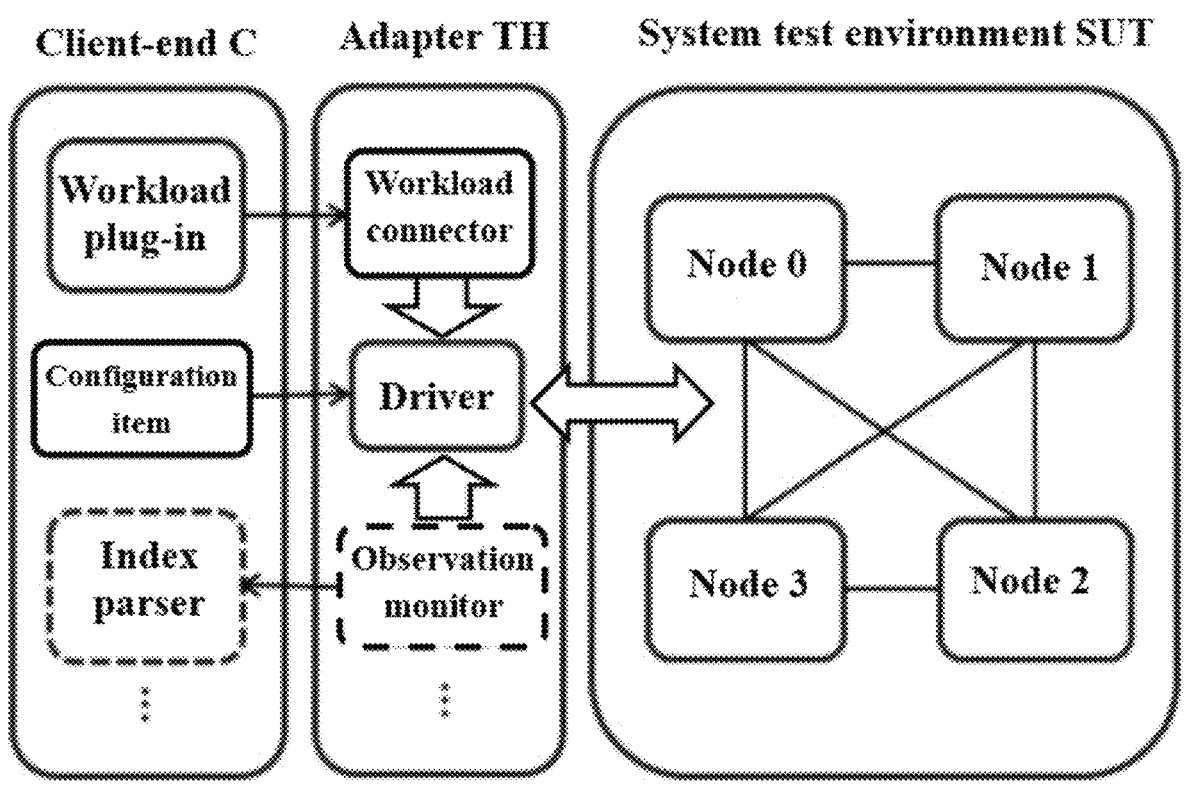
FIG. 1 is a system architecture diagram of a general blockchain performance evaluation method based on a dynamic proxy and a smart contract in an embodiment of the present disclosure.

As shown in FIG. 1, the embodiment provides a general blockchain performance evaluation method based on a dynamic proxy and a smart contract, including following steps:

step 1: a driver component in an adapter calls automated scripts to complete a node configuration and deployment of a chain to be tested defined by a client-side, and designs and implements a layer-by-layer common abstraction interacting with different chains to be tested and encapsulated proxy server network interfaces through a dynamic proxy technology;

step 2: a workload connector in the adapter calls a predefined general hierarchical test workload in the client-side, interacts with the proxy server in a form of Hyper Text Transfer Protocol (HTTP) request response, and calls a network interface to inject the test workload into the environment of the chain system to be tested in the form of script fields or smart contracts for macro and micro tests;

step 3: the environmental observation monitor obtains resource occupation parameters of a workload test program of the chain to be tested when self-designed server nodes run, and a workload test execution result is comprehensively obtained by calling a data query interface and a log query interface in the proxy server network interface realized in the step 1;

step 4: the resource occupation parameters and the test execution result obtained in the step 3 are output to a metric parser of the client-side, and multi-metric parsing scripts are further called to comprehensively calculate, analyze and evaluate system data model, network protocol, consensus efficiency, contract engine, etc. layer by layer; and step 5: the calculation results of the above metrics realize a multi-dimensional display of the test results through the interaction between the back end of Haihe smart chain system data and the front end of Haihe smart chain blockchain browser, and a test report is generated.

Figure 2:
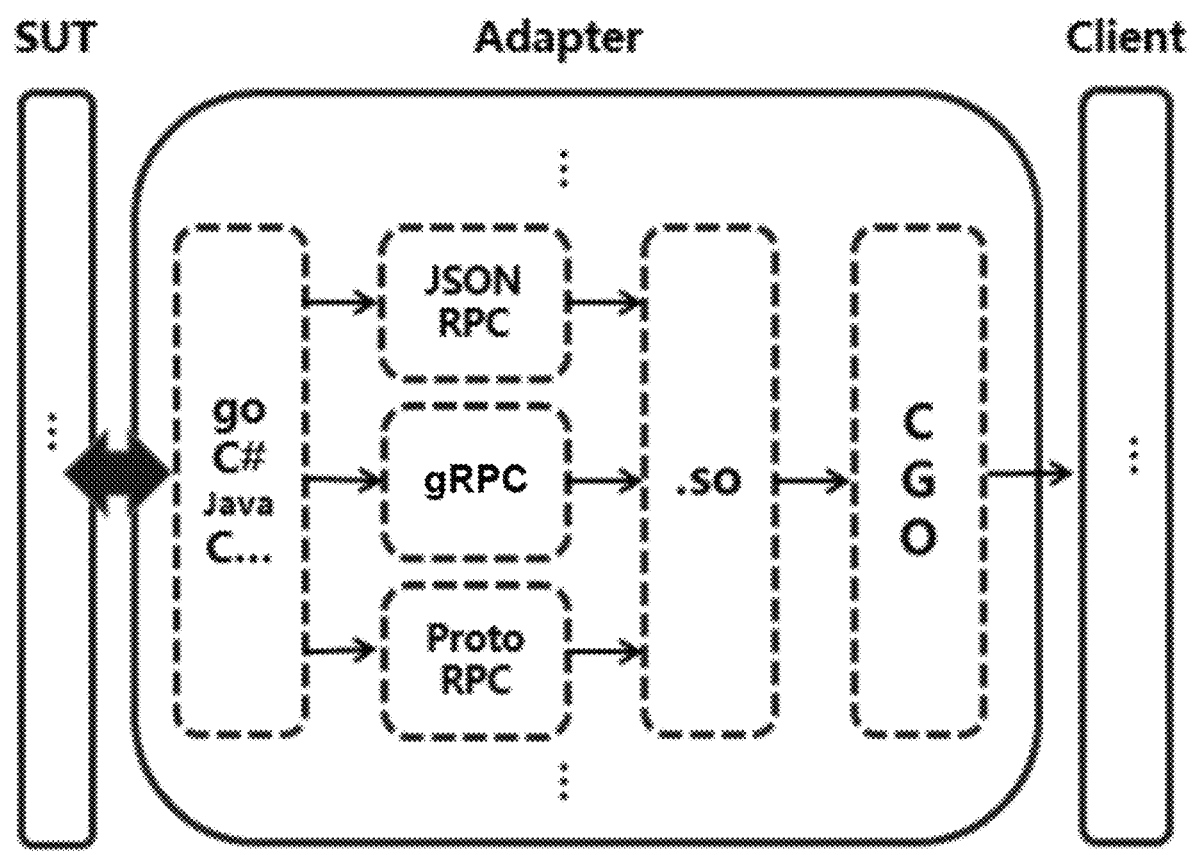
FIG. 2 is an interface design diagram of the general blockchain performance evaluation method based on the dynamic proxy and the smart contract in an embodiment of the present disclosure.

In an embodiment, in the step 1, the automatic deployment and operation of the chain system to be tested is realized through the automatic configuration item scripts, and then interactive modes such as Remote Procedure Call (RPC) and Application Programming Interface (API) provided by different blockchain platforms are abstract and encapsulated, and the open interfaces are easy to realize on mainstream blockchain systems. The specific process is as follows:

firstly, the self-defined configuration item script from the client-side is used to complete SSH login without password, node configuration, dependent installation, source code compilation, account activation, consensus protocol, encryption algorithm, certificate association (dealing with digital identity authentication for license chain), blockchain browser setting and cluster chaining of the chain system to be tested and its running environment with one click. Then, according to basic principles of the reflection mechanism, the dynamic proxy unified Json-based network interface is opened to the test framework, including: 1. RPC and API interfaces provided by the platform of the chain to be tested are imported; 2. the interface structure is defined and specific classes are implemented, such as Hash operation, address conversion, Json parsing, HTTP-related network request operation, etc.; 3. the proxy is realized through the reflection function, and the unified JavaScript Object Notation (JSON) RPC interface is exposed to the client-side, including configuration interface, contract interface and data interface, as shown in FIG. 2, and the proxy interfaces are shown in Table 1.

TABLE 1

Figure 3:
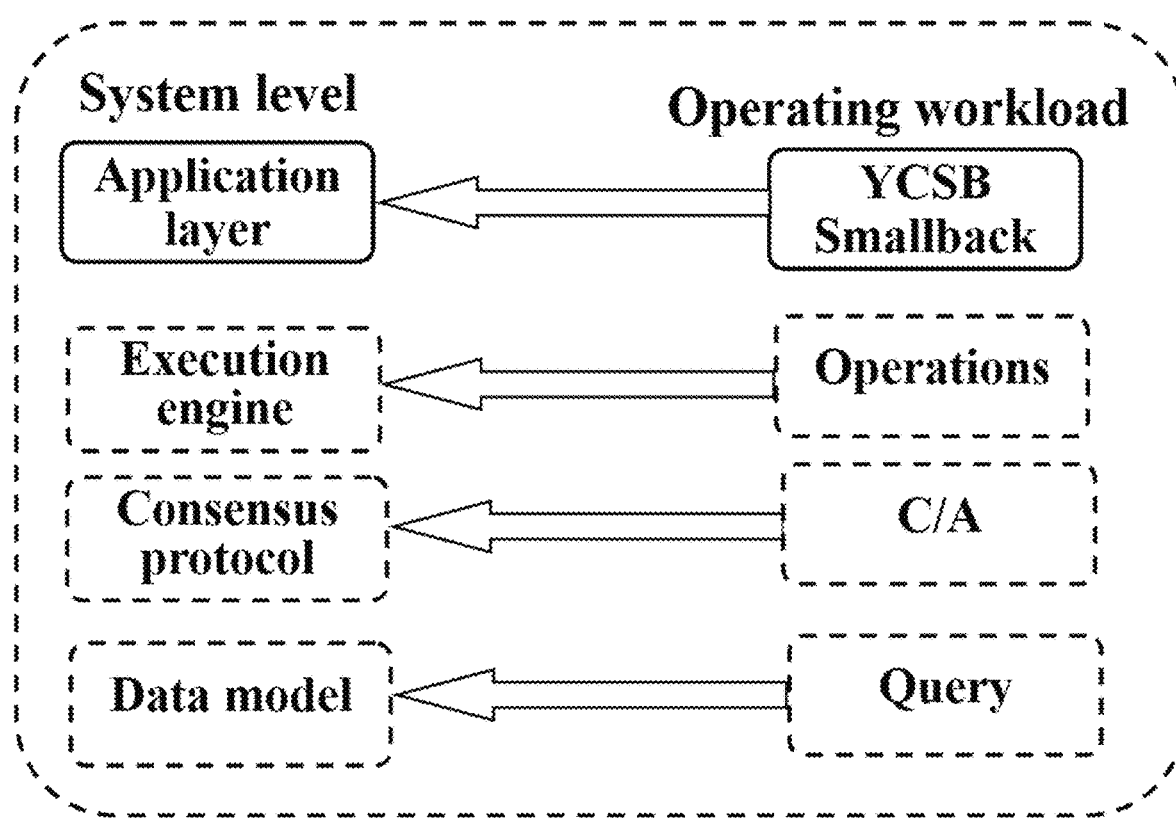
FIG. 3 is a workload design diagram of the general blockchain performance evaluation method based on the dynamic proxy and the smart contract in an embodiment of the present disclosure.
Figure 4:
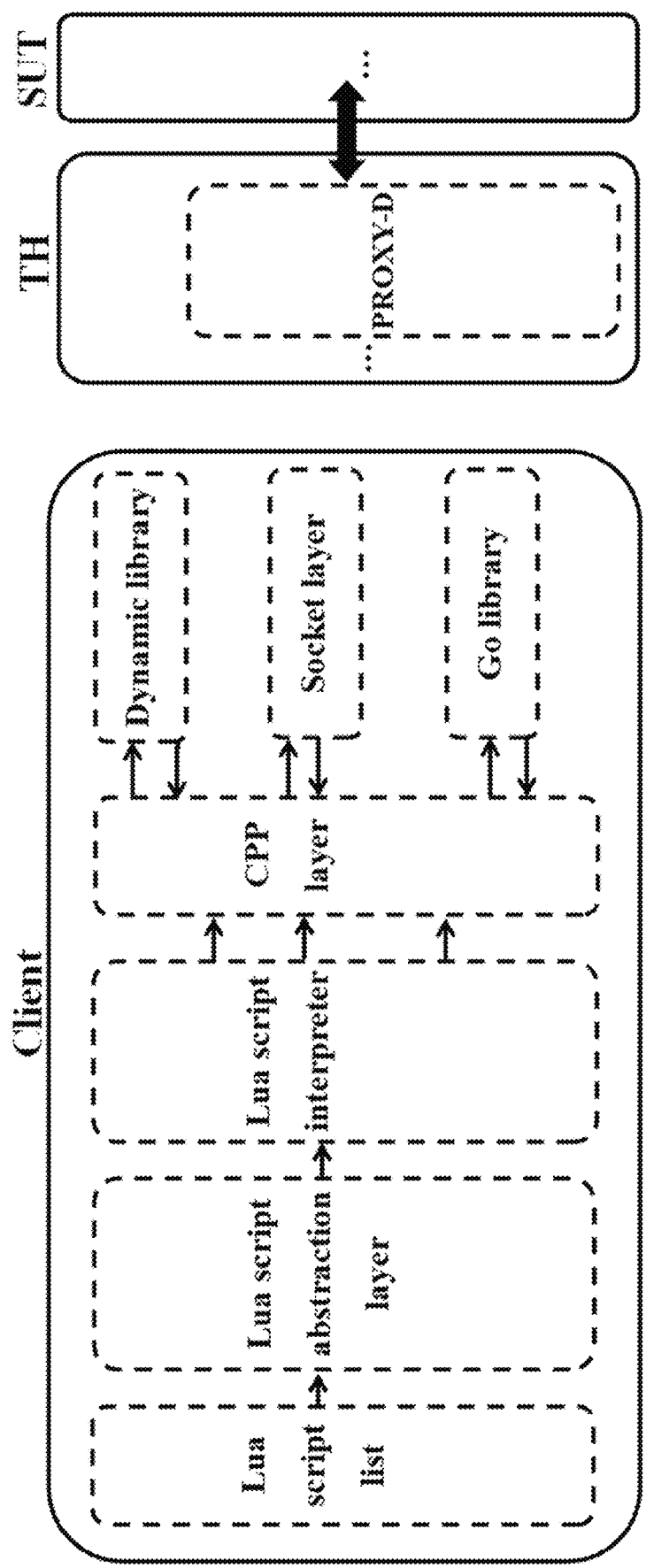
FIG. 4 is a test engine diagram of the general blockchain performance evaluation method based on the dynamic proxy and the smart contract in an embodiment of the present disclosure.

| Interface classification | Interface name | Parameter | Return value | Interface function |
|---|---|---|---|---|
| Configuration interface | InitServer | Registration event | Context state | Initializing context environment of the Server, and providing the Server with the basic information interacting with the chain |
| | StopServer | None | Context state | Stopping the execution of the Server and ending the context environment |
| Contract interface | DeployContract | Contract bytecode | Transaction id | Submitting a contract to the blockchain system and deploying the on-chaining |
| | GetContractAddrByTxId | Deploying the transaction id generated by the contract | Contract on-chaining address | Obtaining the on-chain contract address according to the deployed contract transaction id |
| | InvokeContract | On-chain contract address | Transaction id | Calling a deployed contract function |
| | QueryContract | Calling the transaction id generated by the contract | Result field | Querying a contract |
| Data interface | GetTxById | Transaction id | Transaction information | Obtaining the specific information of the on-chain transaction according to the transaction id |
| | TxExistsById | Transaction id | Boolean value | Judging whether the transaction has been on-chained according to the transaction id |
| | GetCurrentBlockHeight | Chain id | Maximum block height | Obtaining the current maximum block height |
| | GetPMByLogs | Start-stop timestamp | Test metric data list | Obtaining the test metric data list according to the system log | mode based on golang is realized, the concept of Context is introduced, and the common features of the blockchain system are abstracted to ensure the reusability of test workload. The test proxy server of each chain to be tested is a state machine, which may realize a deterministic state transition, and at the same time, a In an embodiment, in the step 2, a hierarchical test workload script list as a test carrier is defined, and uses the network interfaces of the chain to be tested of the workload connector provided in the step 1 to realize an optional on-chaining mode in the form of ordinary transaction or smart contract. The test workload structure is shown in FIG. 3, and the specific process is as follows:

blockchain systems that have implemented the above interfaces in the step 1 may easily use the workload logic designed in the workload plug-in to test the chain performance. The workload plug-in includes an account transfer operation for testing the macro throughput and delay of the system, a read-write set conflict verification operation for testing the parallel efficiency of the contract execution engine, a ratio metric of resource consumption to total consumption during consensus execution used to test the consensus execution efficiency, an operation for testing data random access and query in data layer, and other user-defined workload script lists based on the adjustment of parameters such as block size, transaction input rate and batch size. At the same time, the workload connector opens an option of deploying the chain in the form of ordinary transaction and contract, and completes the input of the performance test of the chain system to be tested from different levels. As a bridge between the workload scripts and the test proxy server, the workload connector receives the instruction information from the workload plug-in of the client-side and then send the instruction information to the test proxy server for execution, as shown in FIG. 4. For workload scripts, the workload connectors provide a deterministic runtime environment for test workloads to ensure the correct execution of test logics in the scripts.

Figure 5:
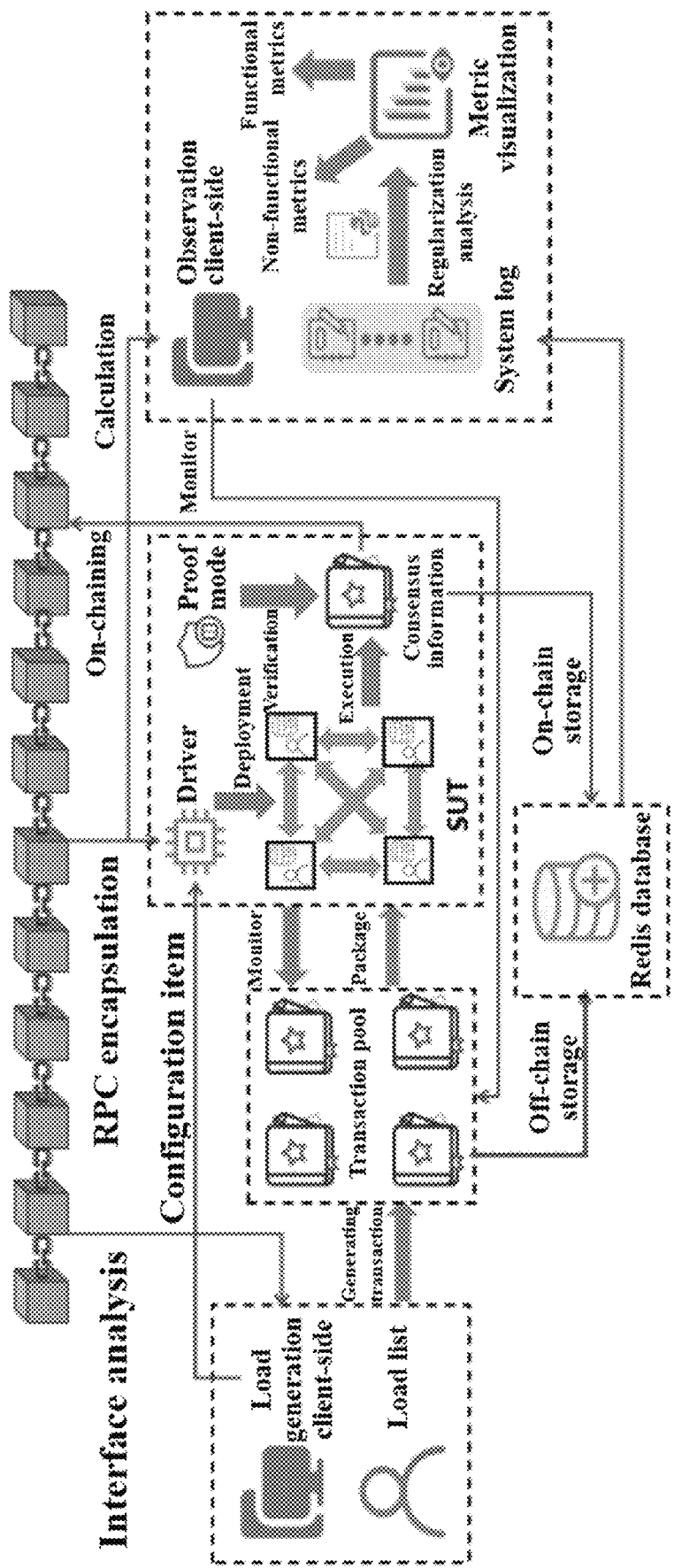
FIG. 5 is a transaction flow chart of the general blockchain performance evaluation method based on the dynamic proxy and the smart contract in an embodiment of the present disclosure.
Figure 6:
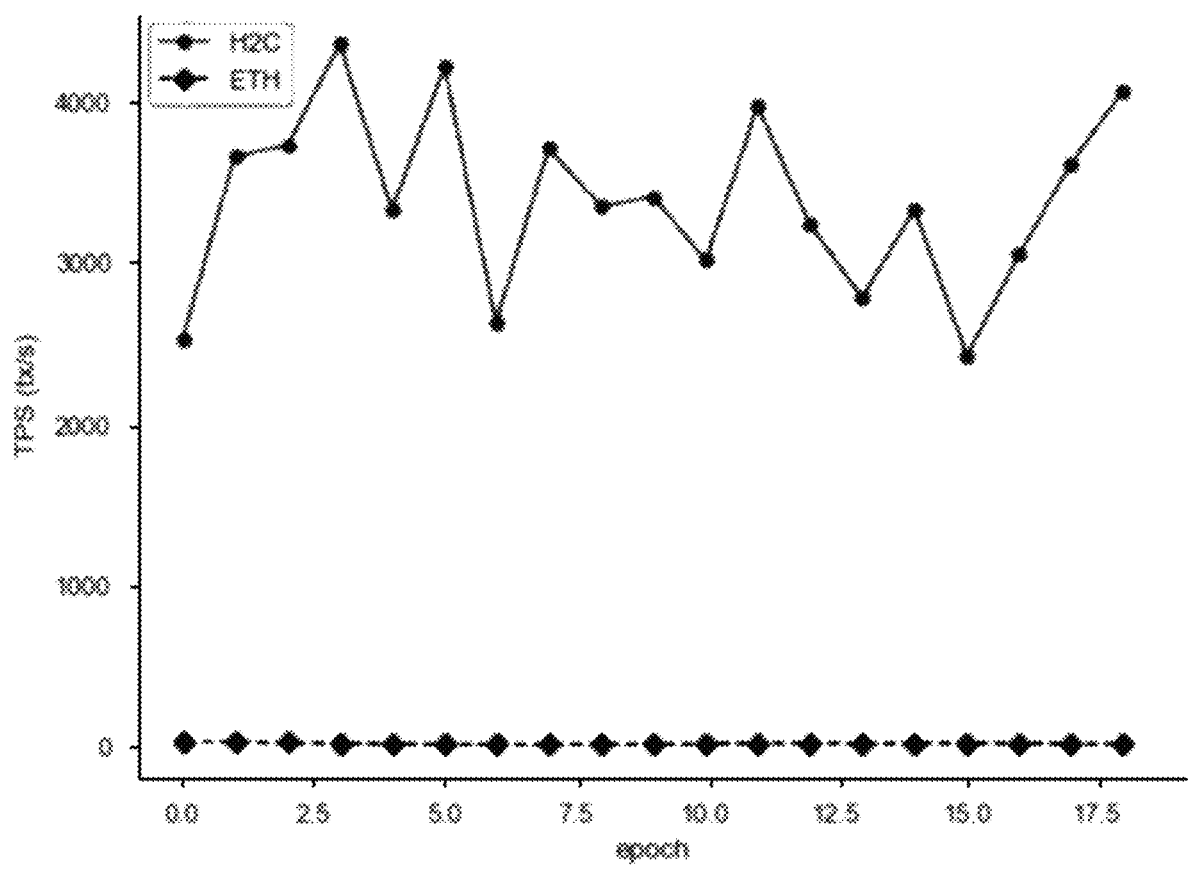
FIG. 6 is a comparison diagram reflecting a transaction volume per second between Haihe smart chain and Ethereum according to the general blockchain performance evaluation method based on the dynamic proxy and the smart contract in an embodiment of the present disclosure.
Figure 7:
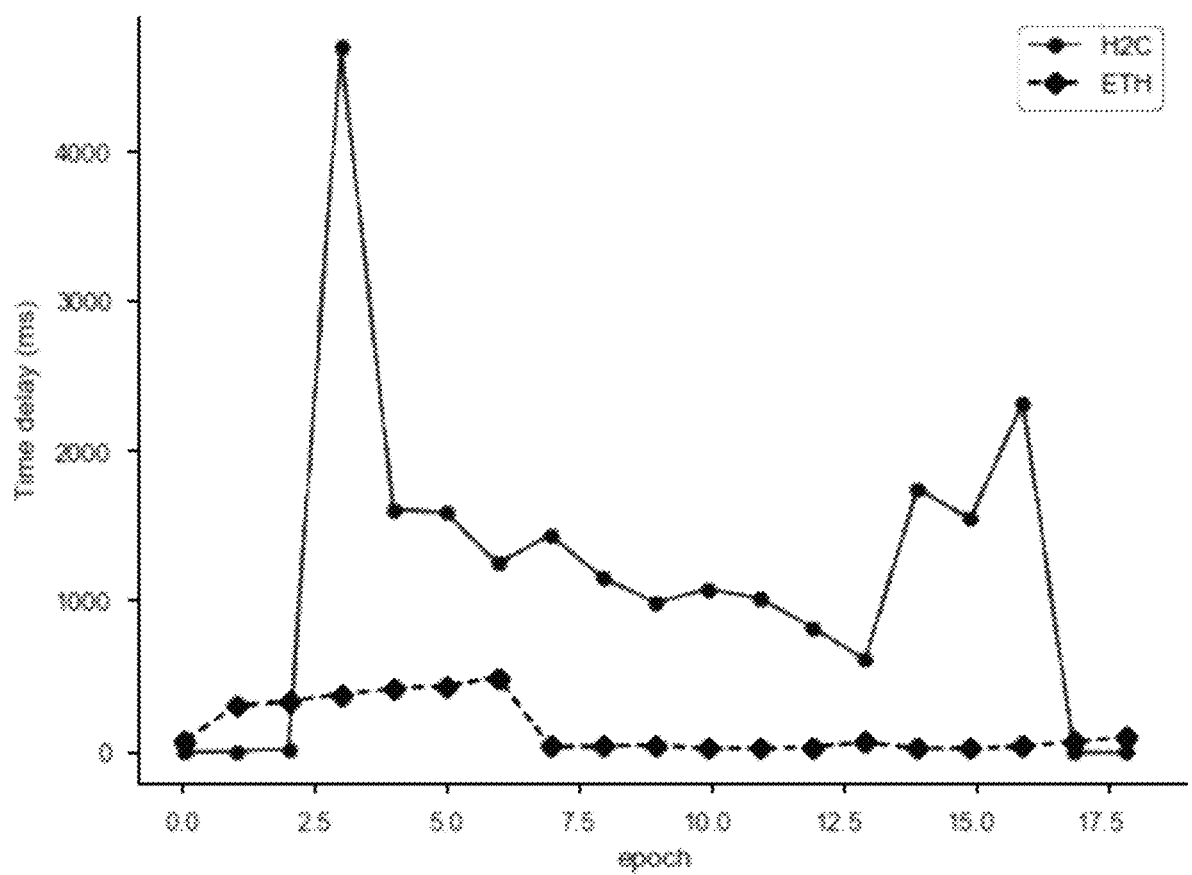
FIG. 7 is a comparison diagram reflecting an average response delay between Haihe smart chain and Ethereum according to the general blockchain performance evaluation method based on the dynamic proxy and the smart contract in an embodiment of the present disclosure.
Figure 8:
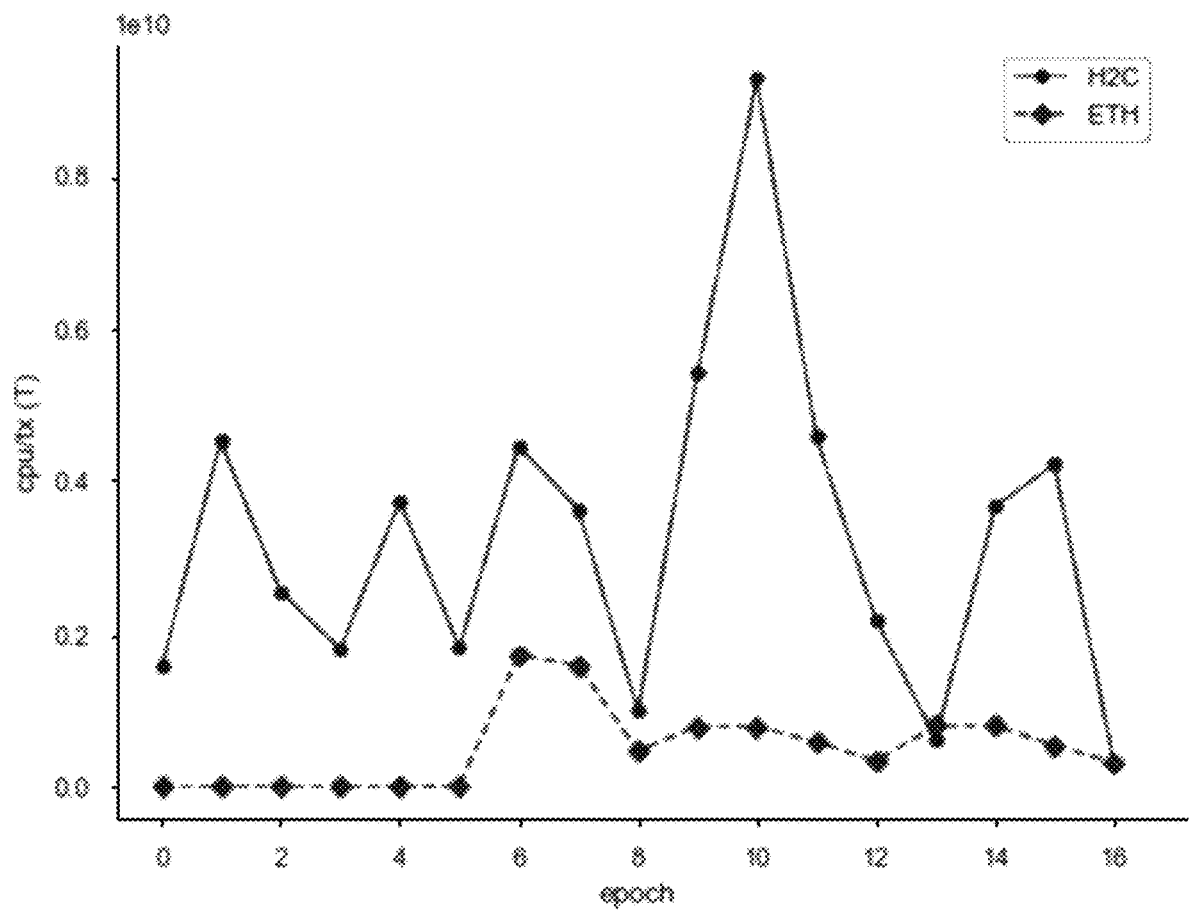
FIG. 8 is a comparison diagram reflecting a transaction volume per Central Processing Unit (CPU) cycle between Haihe smart chain and Ethereum according to the general blockchain performance evaluation method based on the dynamic proxy and the smart contract in an embodiment of the present disclosure.
Figure 9:
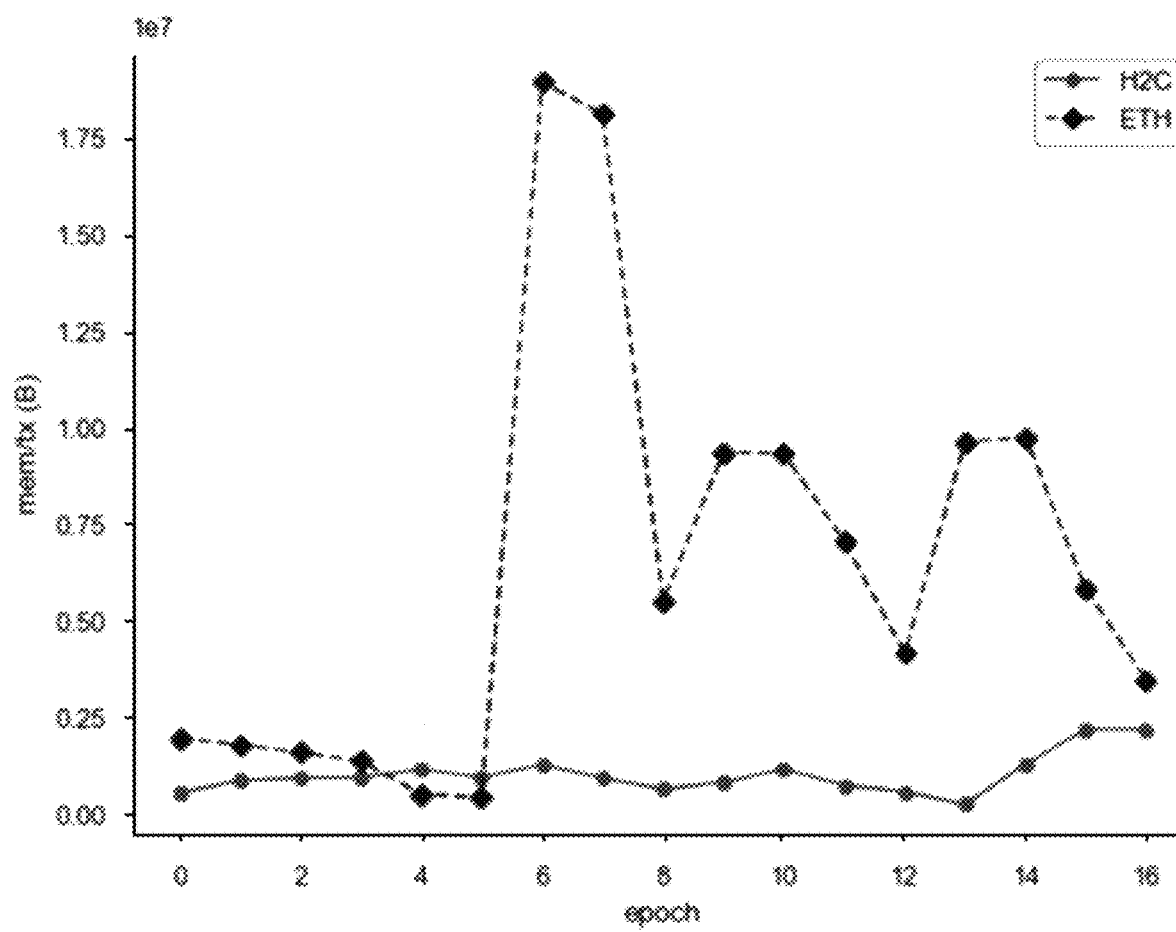
FIG. 9 is a comparison diagram reflecting a transaction volume of memory processing per unit time between Haihe smart chain and Ethereum according to the general blockchain performance evaluation method based on the dynamic proxy and the smart contract in an embodiment of the present disclosure.
Figure 10:
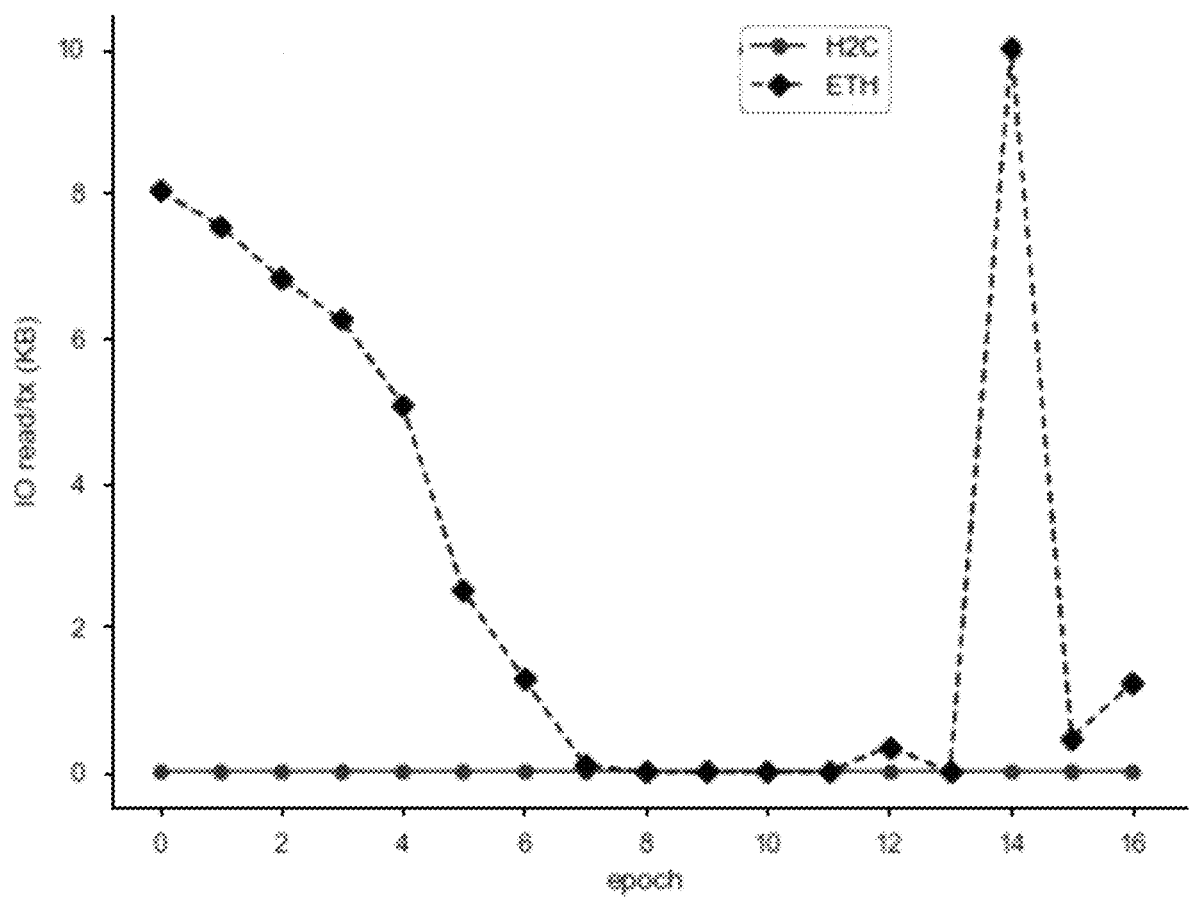
FIG. 10 is a comparison diagram reflecting a transaction volume corresponding to a unit disk reading between Haihe smart chain and Ethereum according to the general blockchain performance evaluation method based on the dynamic proxy and the smart contract in an embodiment of the present disclosure.
Figure 11:
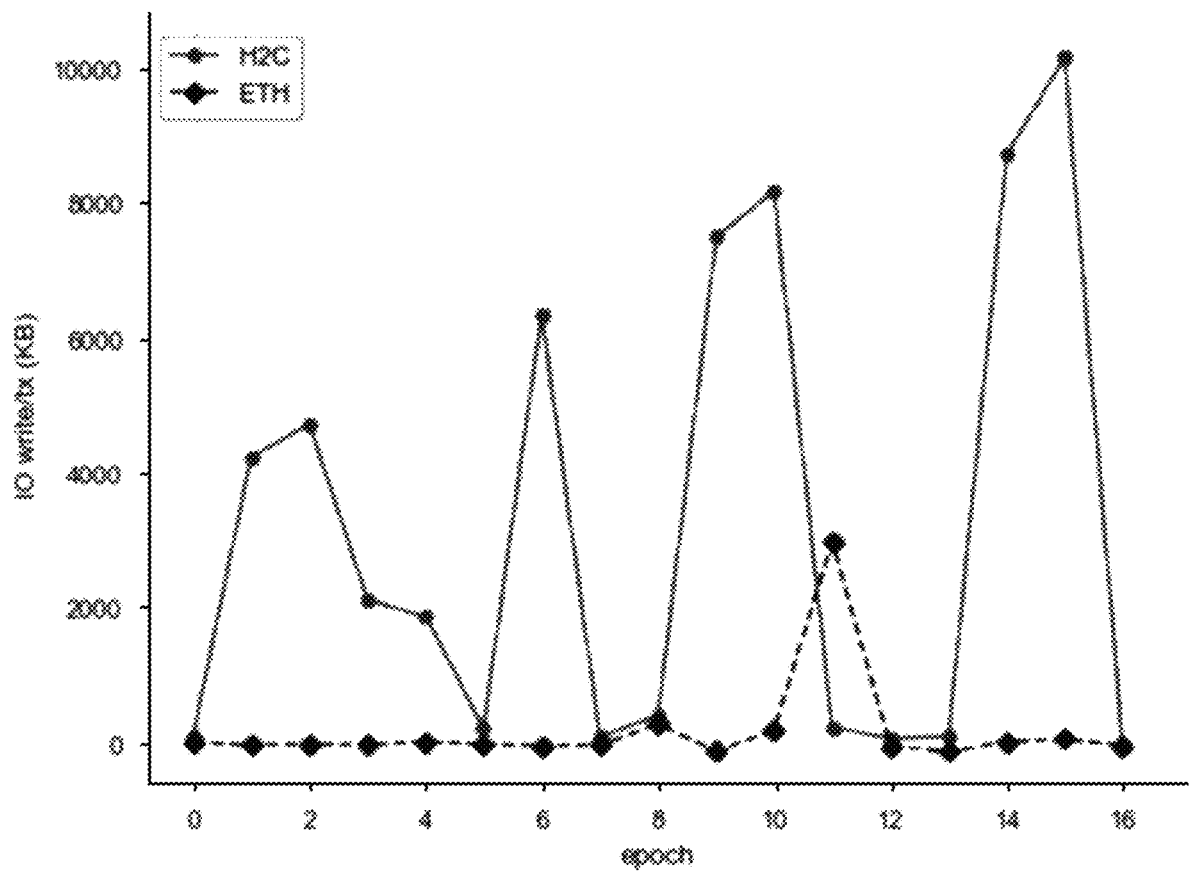
FIG. 11 is a comparison diagram reflecting a transaction volume corresponding to a unit disk writing between Haihe smart chain and Ethereum according to the general blockchain performance evaluation method based on the dynamic proxy and the smart contract in an embodiment of the present disclosure.
Figure 12:
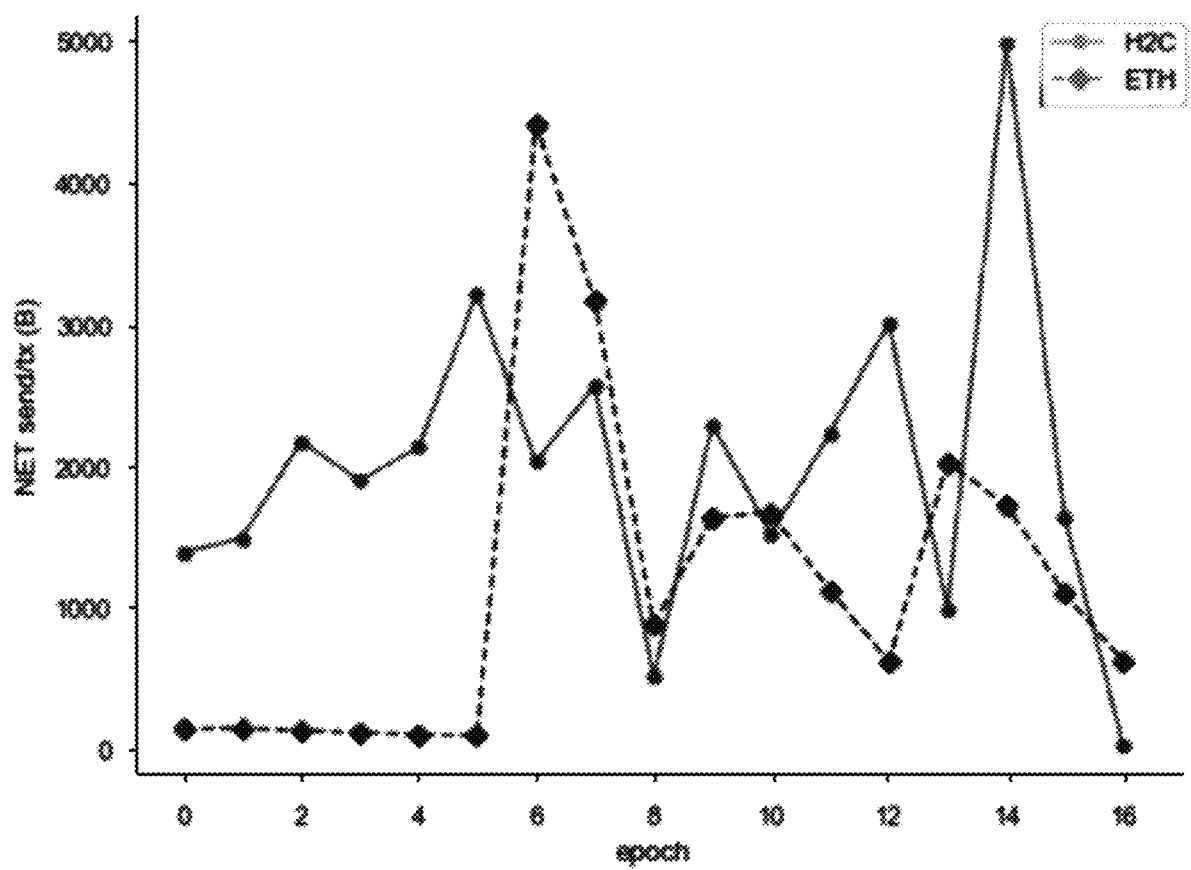
FIG. 12 is a comparison diagram reflecting a transaction volume corresponding to a unit network uplink between Haihe smart chain and Ethereum according to the general blockchain performance evaluation method based on the dynamic proxy and the smart contract in an embodiment of the present disclosure.
Figure 13:
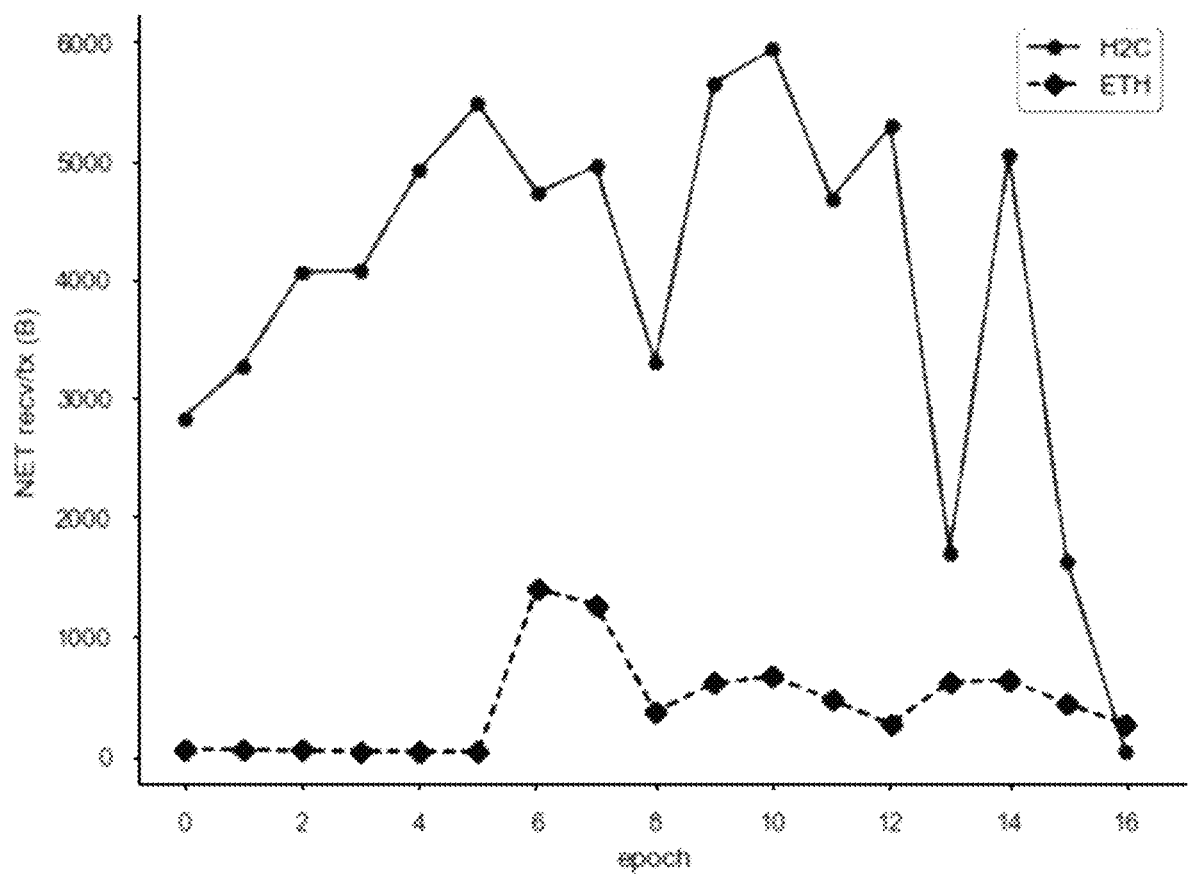
FIG. 13 is a comparison diagram reflecting a transaction volume corresponding to a unit network downlink between Haihe smart chain and Ethereum according to the general blockchain performance evaluation method based on the dynamic proxy and the smart contract in an embodiment of the present disclosure.
Figure 14:
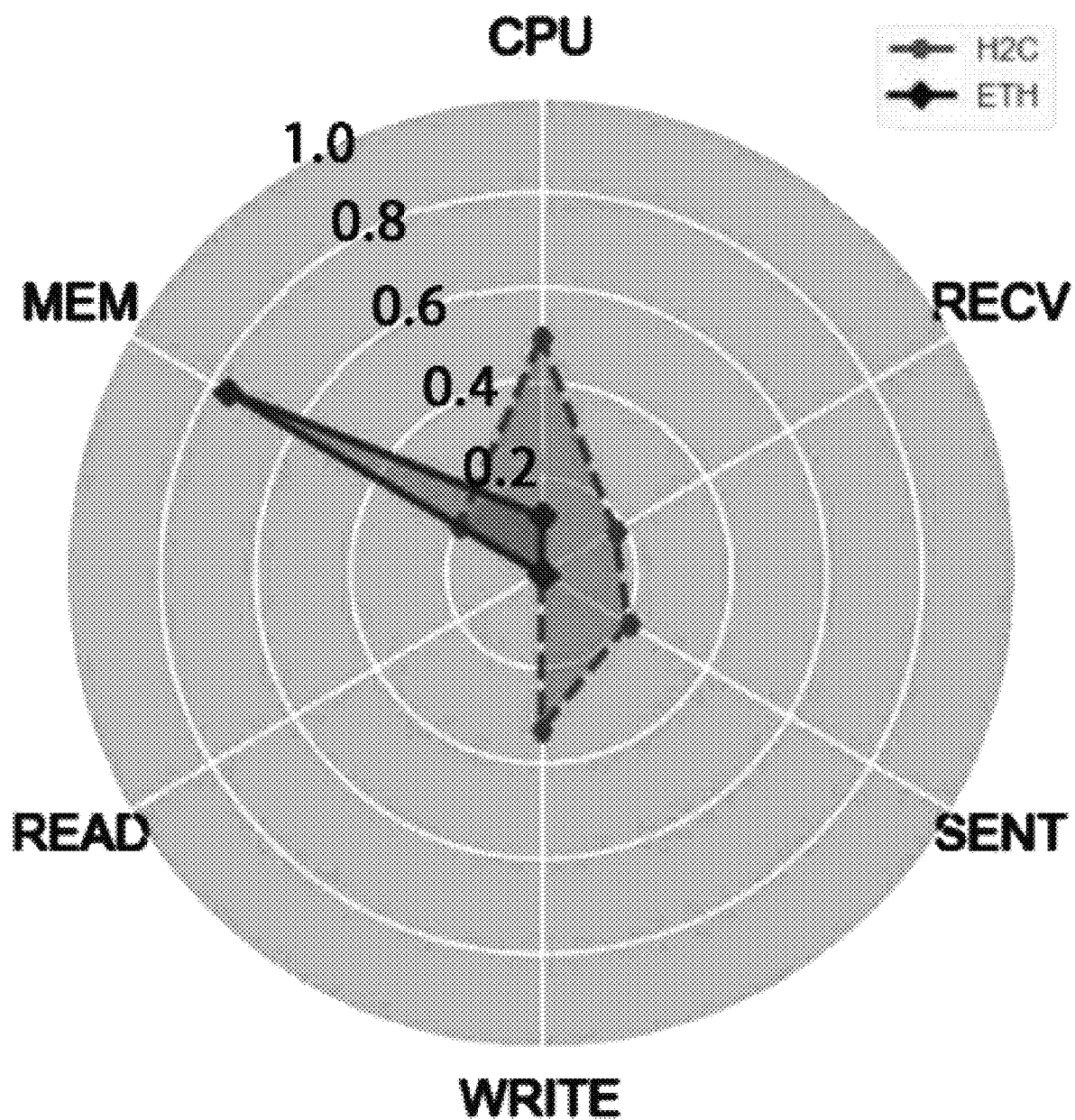
FIG. 14 is a multi-dimensional resource occupation comparison radar chart between Haihe smart chain and Ethereum according to the general blockchain performance evaluation method based on the dynamic proxy and the smart contract in an embodiment of the present disclosure.
Figure 15:
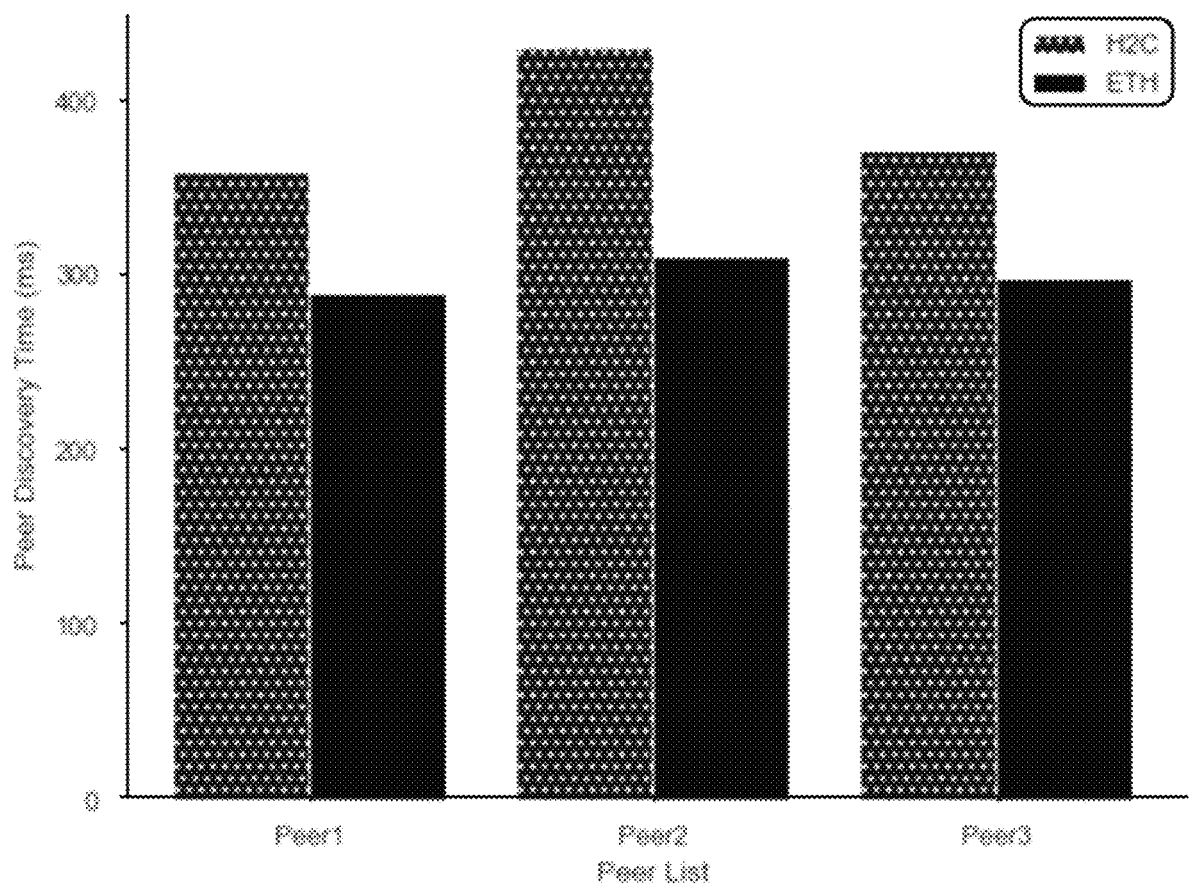
FIG. 15 is a comparison diagram of a node discovery time between Haihe smart chain and Ethereum according to the general blockchain performance evaluation method based on the dynamic proxy and the smart contract in an embodiment of the present disclosure.
Figure 16:
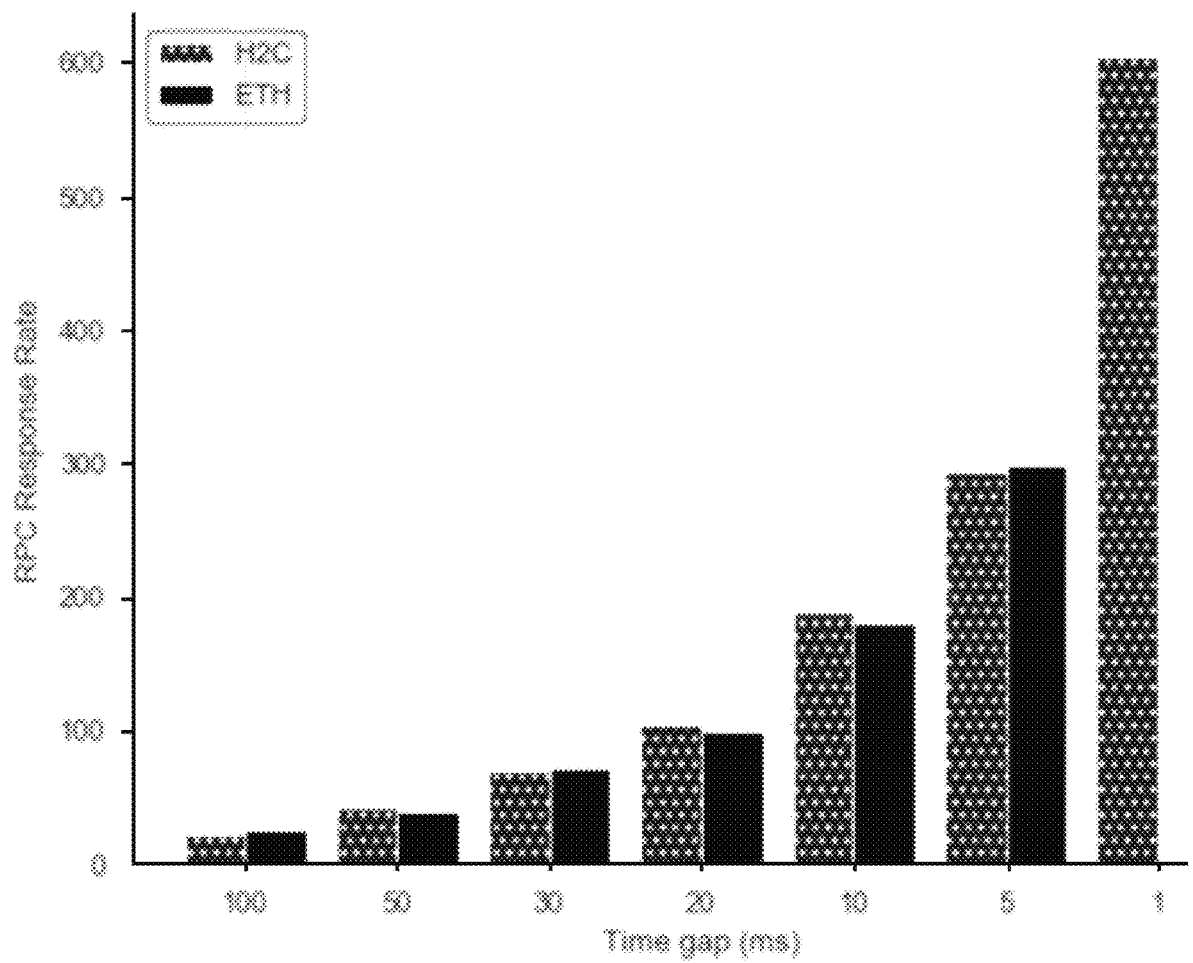
FIG. 16 is a comparison diagram of a Remote Procedure Call (RPC) response rate between Haihe smart chain and Ethereum according to the general blockchain performance evaluation method based on the dynamic proxy and the smart contract in an embodiment of the present disclosure.
Figure 17:
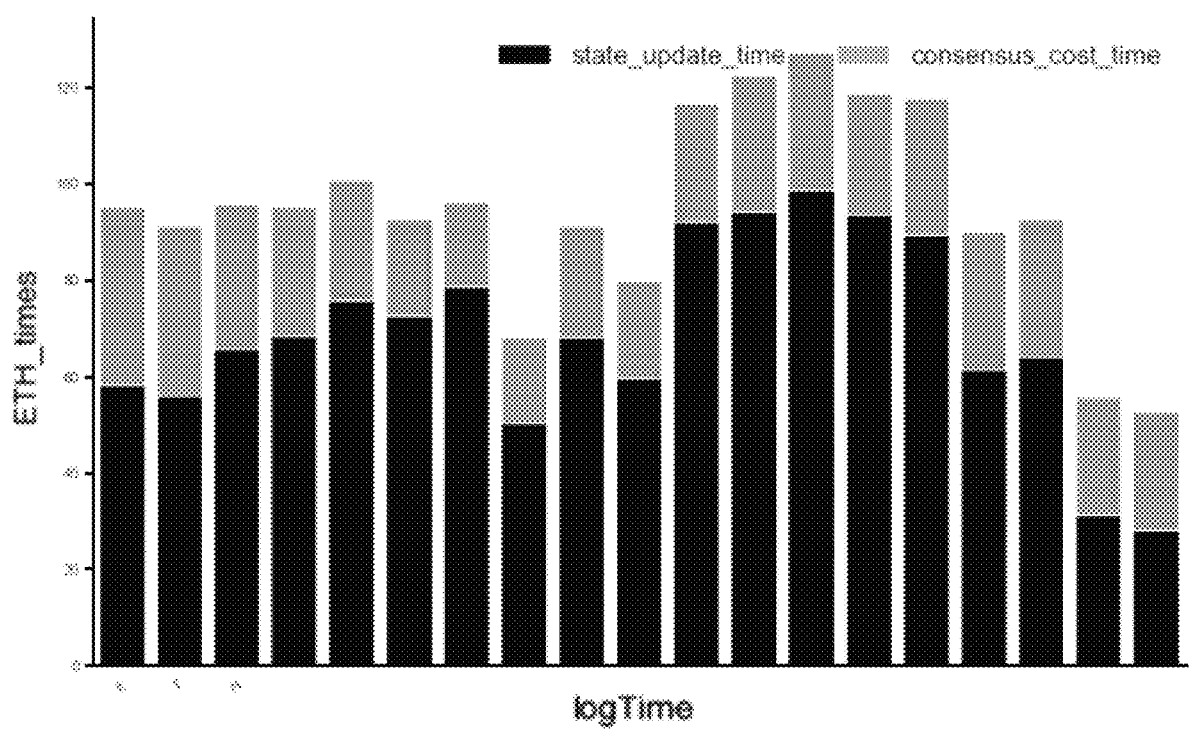
FIG. 17 is a comparison diagram of a consensus reaching time and a state updating time of Ethereum according to the general blockchain performance evaluation method based on the dynamic proxy and the smart contract in an embodiment of the present disclosure.
Figure 18:
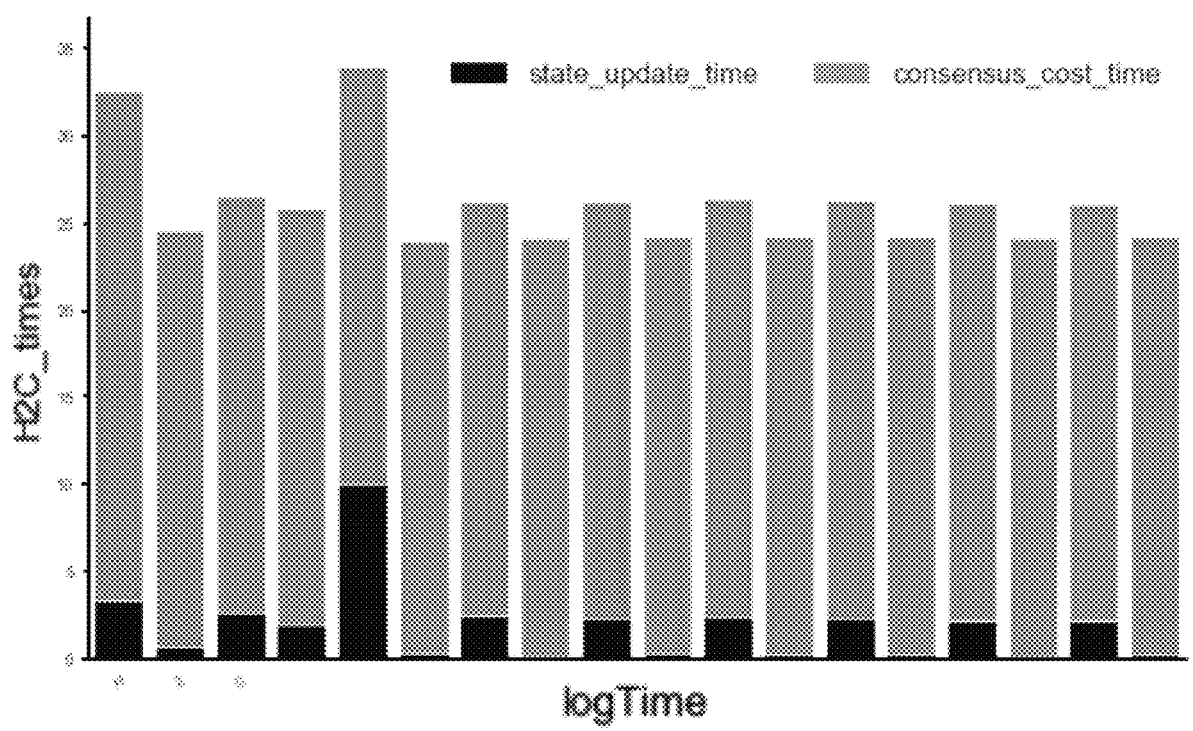
FIG. 18 is a comparison diagram of a consensus reaching time and a state updating time of Haihe smart chain according to the general blockchain performance evaluation method based on the dynamic proxy and the smart contract in an embodiment of the present disclosure.

In an embodiment, in the step 3, the test result is polled and subjected to log pulling on the basis of the step 1 and the step 2, so as to obtain the output of the workload test. The specific process is as follows:

in the step 2, after the adapter calls the encapsulation interface to inject the workload into the running environment of the chain system to be tested, the chain system to be tested executes roughly according to the transaction flow as shown in FIG. 5. After steps of smart contract execution and transaction verification, the transaction is packaged into blocks, and the workload contract is successfully called. The observation monitor queries on-chain data state by polling the scheduling thread, obtains the resource usage at the node process level by calling the monitor program, including CPU occupation, memory occupation, disk I/O, network traffic, etc., and parses the system output log by calling the parse program to obtain log field information of processes such as node joining, RPC response, transaction broadcasting, contract execution, state updating, consensus reaching, etc., and summarizes and calculates the above-mentioned on-chain data state, node process resource usage and log field information to obtain the workload test execution result.

In an embodiment, in the step 4, the workload test execution result data is input into various metric model scripts on the basis of the step 1, the step 2 and the step 3, and calculates the fine-grained performance evaluation. The specific process is as follows:

because the system throughput and the transaction delay may only reflect the macro performance of the system to be tested, resulting in one-sided results, a self-designed hierarchical performance calculation model is used. The self-designed hierarchical performance calculation model includes system throughput, average response delay, transaction success rate, unit transaction cost, transaction volume per CPU, transaction volume per memory, reading and writing transaction volume per disk, transaction volume per network traffic, node RPC response rate, transaction propagating rate, contract execution time, state updating time, consensus-cost time, consensus energy consumption ratio, and energy consumption ratio of contract form and script execution under the same execution logic, so as to comprehensively evaluate the performance of the system to be tested. The details are shown in Table 2.

TABLE 2

| Metric category | Metric name | Metric meaning |
| --- | --- | --- |
| Macro metric | Transactions Per Second[1] | Transaction volume per second |
| | Average Response Delay[1] | Average response delay |
| | Transactions Per CPU | Transaction volume per CPU |
| | Transactions Per Memory | Transaction volume per memory |
| | Transactions Per Disk I/O | Reading and writing transaction volume per disk |
| Micro metric | Peer Discovery Rate[1] | Rate of discovering new nodes |
| | RPC Response Rate[1] | Node RPC response rate |
| | Transaction Propagating Rate[1] | Transaction propagating rate |
| | Contract Execution Time | Contract execution time |
| | State Updating Time | State updating time |
| | Consensus-Cost Time | Consensus reaching time |

In the embodiment, in the step 5, the visual data center and blockchain browser are used to achieve multidimensional display of the test result and the test report is generated on the basis of the step 1, the step 2, the step 3 and the step 4. The specific steps are as follows:

by summarizing and sorting out the calculation results of the above performance calculation model, the data visualization is realized by the asynchronous interaction between the back end of Haihe smart chain system data center and the front Web interface of Haihe smart chain blockchain browser. As shown in FIGS. 6-18, the evaluation results are presented in the form of tables, images and dynamic curves, and the test report is automatically generated, which is convenient for providing further guidance and reference for the performance improvement and design optimization of the blockchain system.

Embodiment 2

Firstly, the experimental environment and the configuration are introduced. The IchainTest test platform is a service cluster composed of four Alibaba Cloud nodes. One node 39.103.156.177 is deployed as a client-side program to send transaction workload, and the other three nodes 101.201.46.135, 39.103.194.213 and 123.56.133.165 are deployed with the chain system to be tested, it may realize the transaction sending from the client-side to a single node or one-to-many transaction sending, and realize the workload balancing strategy design for the test, which can make full use of the overall computing power of the cloud computing cluster and improve the overall efficiency of the test. The performance parameters of each node are configured as follows: all nodes are running on x86_64 virtual machine in Alibaba Cloud. Each virtual machine is allocated 32 Intel® Xeon® CPU E5-2683 v3 @ 2.000 Hz vCPU and 32 GB of memory. The client-side computer used for generating the workload is allocated 56 vCPU and 128 GB of memory. Nodes are connected to the 3 Gbps data center network.

Taking Haihe smart chain, Ethereum and ChainMaker as examples, the use process of the evaluation framework is further explained.

FIG. 1 is a schematic diagram of the overall architecture of the system, and the test transaction flow is shown in FIG. 4. Ethereum, ChainMaker and Haihe smart chain are all blockchain systems supporting smart contracts. Although the internal principles of consensus algorithm, storage logic and contract execution are different, Ethereum, ChainMaker and Haihe smart chain all support basic blockchain functions. In the aspect of chain interaction, Ethereum supports Json RPC, ChainMaker and Haihe smart chain support Protobuf RPC, so it is easy to interact with the chain system.

In terms of external interface design, the Json RPC interface design of Ethereum is more detailed and comprehensive, and there are separate interface designs for many aspects of the chain system, and the interactive interface in Json form reduces the reading difficulty and development threshold. In contrast, there are fewer types of RPC interfaces in ChainMaker and Haihe smart chain, but ChainMaker and Haihe smart chain provide rich system contracts, and the same functions may be realized by calling the system contracts. Compared with Json format, RPC interaction in protoBuf form is more complicated and more difficult to read, so the corresponding Proto description file must be provided to be called and parsed normally.

The workload generator uses Lua script, which allows users to customize the workload logics. The test engine and the proxy server use a unified Json to interact, thus shielding differences of interaction modes of different blockchain systems. The API proxy server specifies several interfaces for the three chains to realize the test engine, and implements their interactive logic on their respective chains. Macro test and micro test logic are unified into workload plug-in scripts for implementation.

For the design of general API proxy server interface, the concept of Context is introduced to abstract the common features of the blockchain system. In the overall testing framework, each API proxy server is a state machine, and it is necessary to keep the consistency of the context environment and realize the deterministic transfer of the state during the testing process. Context is an important concept in the design of API proxy server that recording the current account information such as basic account information (public and private key equivalence), target node information (node IP, port number, etc.), endorsement list of the server as a proxy of the chain system to be tested. The Context provides the API proxy server with the ability to interact with the chain. Through the Context, it is more convenient to locate the role and function of the API proxy server in the test framework, and ensure the robustness of the whole test environment and the correctness of the test result. The workflow is as follows: first, starting the proxy server (server), waiting for the network layer to provide initialization instructions, thus generating the context, then reading the instructions from the network layer, entering a state of loop execution instructions and completing the state transfer until the execution result is submitted to the blockchain system.

The test engine first accepts logical instructions from the workload plug-in (Lua workload scripts), and further shields the syntax and logic differences of different chain systems at the script level through the Lua script abstraction layer. Then Lua script interpreter explains Lua script semantics, which is executed by the underlying CPP layer. The CPP layer encapsulates some necessary dynamic libraries and GO libraries, which may be called through Lua scripts. The final processed result is sent to the remote API proxy server through the built-in Socket layer network module.

The dynamic library and GO library encapsulated by the test engine provide some common function operations in the blockchain system, such as Hash operation, address translation, Json parsing, and HTTP related network request operations. The purpose is to make common operations such as Hash operation to be completed on the test client-side, thus greatly reducing the implementation difficulty of the API proxy server side and the complexity of the corresponding interface.

Although the transaction execution logics of Haihe smart chain, Ethereum and ChainMaker systems are not exactly the same, the common abstract steps, as essentially shown in FIG. 5, all go through the steps of transaction pool queuing, smart contract execution, transaction verification, etc., then the transaction is packaged into blocks, and the workload contract is successfully called. The observation monitor queries on-chain data state by polling the scheduling thread, obtains the resource usage of the node execution environment by calling the monitor program, including CPU occupancy, memory occupancy, disk I/O, network traffic, etc., and parses the system output log by calling the parse program to obtain the log information of processes such as node joining, RPC response, transaction broadcasting, contract execution, state updating, consensus reaching, etc., and summarizes the on-chain data state, the resource usage of the node execution environment and the process log information to obtain the workload test execution result.

Then the hierarchical performance calculation model shown in Table 2 is used, including system throughput, average response delay, transaction volume per unit of CPU, transaction volume per unit of memory, reading and writing transaction volume per unit of disk, transaction volume per unit of network traffic, node RPC response rate, transaction propagating rate, contract execution time, state updating time, consensus reaching time, consensus energy consumption ratio, and energy consumption ratio of contract form and script execution under the same execution logic. In fact, the delays involved here all refer to a distribution, and should not be just a number. Therefore, it is more appropriate to use stacking histogram or Cumulative Distribution Function (CDF) chart for the experimental result. If the delay distribution is relatively simple, the average delay may also be used instead. The unit transaction cost metric is increased because individual users don't really care about throughput, but really care about delay and transaction cost. In addition, it is necessary to increase the measurement metric of transaction success rate. The current stress test actually contains many invalid transactions. The transaction success rate refers to a ratio of successfully submitted transactions to the number of transaction requests sent, which may provide a good reference.

By summarizing and sorting out the calculation results of the above performance calculation model, the data visualization processing is realized by the asynchronous interaction between the back end of Haihe smart chain system data center and the front WEB interface of Haihe smart chain blockchain browser, as shown in FIGS. 6-18. By setting the test workload script for adjusting the transaction queue size, endorsement strategy, transaction sending rate and other parameters, the evaluation results are presented in the form of tables, images and dynamic curves, and the test report is automatically generated, which is convenient for providing further guidance and reference for the performance improvement and design optimization of blockchain system.

The disclosure provides a general blockchain performance evaluation method based on the dynamic proxy and the smart contract, which consists of a client module, an adapter module and a system test environment module. The main innovations are a general adapter, various workload lists and a blockchain hierarchical performance evaluation model realized by using dynamic proxy technology. According to the disclosure, detailed layer-by-layer performance evaluation may be carried out for mainstream blockchain systems in the market, high customization is provided by replacing Lua scripts in workload generation, and at the same time, abstract interfaces are provided for various blockchain systems to ensure the reusability of test workloads. The scope of protection is the adaptive construction method based on dynamic proxy, the calculation model used in layer-by-layer evaluation and the overall system framework. There are many applications for blockchain performance testing, and the method of transformation and improvement based on the disclosure also belongs to the scope of protection of the disclosure.

The above are only preferred embodiments of the disclosure, but the protection scope of the disclosure is not limited to this. Any change or replacement that may be easily thought of by a person familiar with this technical field within the technical scope disclosed in the disclosure should be covered by the disclosure. Therefore, the protection scope of the disclosure should be based on the protection scope of the claims.

What is claimed is:

1. A method of detecting performance of general blockchain based on a dynamic proxy and a smart contract, comprising following steps processed on a computer:
    calling, a driver component in an adapter, automated scripts to complete a node configuration and deployment of a chain to be tested defined by a client-side, and designing a layer-by-layer common abstraction interacting with different chains to be tested and encapsulated proxy server network interfaces through a dynamic proxy technology;
    obtaining a general hierarchical test workload, and obtaining an environmental test result of the chain system to be tested based on the proxy server network interface and the general hierarchical test workload;
    executing the smart contract for obtaining a workload test execution result based on the proxy server network interface and the environmental test result;
    wherein the obtaining the environmental test result of the chain system to be tested based on the proxy server network interface and the general hierarchical test workload comprises:
    calling, a workload connector in the adapter, a predefined general hierarchical test workload in the client-side;
    interacting the general hierarchical test workload with a proxy server, inputting the general hierarchical test workload into an environment of the chain system to be tested in a form of a script field or the smart contract based on the proxy server network interface, and obtaining the environmental test result of the chain system to be tested; and
    carrying out a multi-dimensional evaluation on the workload test execution result to complete a blockchain performance evaluation;
    wherein the obtaining the workload test execution result based on the proxy server network interface and the environmental test result comprises:
    wherein the proxy server network interface comprises a data query interface and a log query interface;
    polling and carrying out log pulling against the environmental test result based on the data query interface and the log query interface to obtain the workload test execution result;
    wherein the polling and carrying out log pulling against the environmental test result based on the data query interface and the log query interface to obtain the workload test execution result comprises:
    polling the environmental test result based on the data query interface to obtain an on-chain data state;
    calling a monitor program to obtain a resource usage of a node execution environment based on the environmental test result;
    carrying out log pulling against the environmental test result to obtain process log information based on the log query interface; and
    summarizing the on-chain data state, the resource usage of the node execution environment and the process log information to obtain a workload test execution result.

2. The method based on the dynamic proxy and the smart contract according to claim 1, wherein the configuring the chain system to be tested based on the automation configuration item script specifically includes: SSH login without password, node configuration, dependent installation, source code compilation, account activation, consensus protocol, encryption algorithm, certificate association, blockchain browser setting and cluster chaining.

3. The method based on the dynamic proxy and the smart contract according to claim 1, wherein the designing the proxy server network interface of the chain system to be tested comprises:
    carrying out a layer by layer abstraction on the chain system to obtain common features of the chain system to be tested; and
    encapsulating the common features of the chain system to be tested to obtain the proxy server network interface in a preset format.

4. The method based on the dynamic proxy and the smart contract according to claim 1, wherein the carrying out the multi-dimensional evaluation on the workload test execution result to complete the blockchain performance evaluation comprises:
    inputting the workload test execution result into various metric model scripts, and obtaining a performance evaluation model based on metric parsing scripts; and
    carrying out the multi-dimensional evaluation on the performance evaluation model to complete the blockchain performance evaluation.

5. The method based on the dynamic proxy and the smart contract according to claim 4, wherein the carrying out the multi-dimensional evaluation on the workload test execution result to complete the blockchain performance evaluation further comprises:
    carrying out the multi-dimensional evaluation based on the performance evaluation model to obtain a multi-dimensional evaluation result; and
    forming an evaluation report on the multi-dimensional evaluation result, and displaying the evaluation report.

6. The method based on the dynamic proxy and the smart contract according to claim 5, wherein the performance evaluation model comprises system throughput, average response delay, transaction success rate, unit transaction cost, unit CPU transaction volume, unit memory transaction volume, unit disk reading and writing transaction volume, unit network traffic transaction volume, node RPC response rate, transaction propagating rate, contract execution time, state updating time, consensus reaching time, consensus energy consumption ratio, and energy consumption ratio of contract form and script execution under a same execution logic.

\* \* \* \* \*